July 2, 1963 A. ODENWALD 3,096,417

SMALL-TYPE THERMOSTAT FOR PREVENTING OVERHEATING, PROVIDED WITH A BIMETAL DISK AND A CONDUCTOR DISK IN A LENTICULAR CASING

Filed April 7, 1959 2 Sheets-Sheet 1

INVENTOR
Alfred Odenwald
BY
Michael S. Striker
Attorney

INVENTOR
Alfred Odenwald
BY Michael S. Striker
Attorney

United States Patent Office 3,096,417

Patented July 2, 1963

3,096,417

SMALL-TYPE THERMOSTAT FOR PREVENTING OVERHEATING, PROVIDED WITH A BIMETAL DISK AND A CONDUCTOR DISK IN A LENTICULAR CASING

Alfred Odenwald, Steinbergsgutstrasse 22, Pforzheim, Germany

Filed Apr. 7, 1959, Ser. No. 804,771
Claims priority, application Germany May 16, 1958
2 Claims. (Cl. 200—138)

Figure 1:
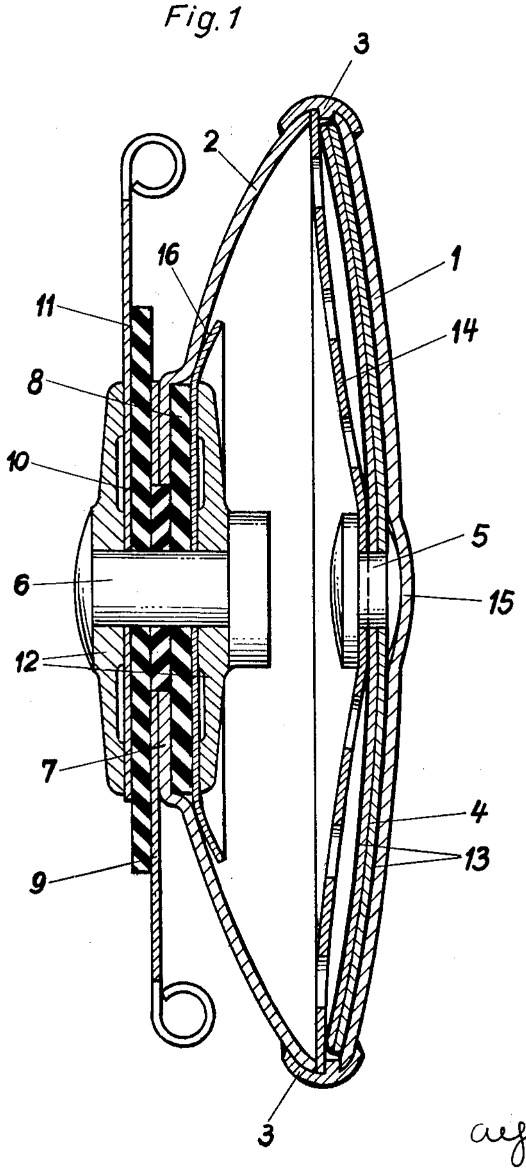

The present invention relates to a small-type thermostat, particularly to prevent overheating in electrical apparatus as well as in the windings of machinery and transformers, and is equipped with a curved bimetal disk secured in its position at the rim of a casing, and which preferably in conformity with the German patent (application 0.2355 VIIIb/21c) is provided in its center with a rivet-contact of high-grade contact material adapted for co-operation with a counter-rivet-contact positioned at the casing.

According to the invention the further development of the small-type thermostat of the main-patent involves the possibility of an increased current conduction and consequently also an increased switching effect, and simultaneously an improved heat transmission to the bimetal disk, that is to say, an improved reaction. For this purpose the small-type thermostat of the invention is equipped with a bimetal disk which is preferably coated on all sides with a current and heat well conducting polished metal layer, particularly of galvanic silver. The result is a considerably improved current and heat transmission not only from the central contact, but also at the bimetal rim. Simultaneously, there are produced more favorable bearing conditions for the bimetal rim when snapping in opposite direction in the casing. As also deutoxide of silver is a well-conducting metal there will be produced an effective bimetal surface also when a galvanic silver coating is employed. It has to be taken into consideration that there are ordinarily employed as bimetal disks heat and current poorly conducting nickel steel alloys, so that by the current and heat well-conducting metal coating of the invention, on the one hand, an undesired heating of the bimetal disk is avoided even at considerable switching activity, while, on the other hand, a too inactive heat conduction in case of emergency is reliably prevented.

According to a further proposition of the invention there may be achieved still higher switching effects at quickest reaction by the employment in combination with a galvanic silver coating of the bimetal disk of a flexible current conductor connecting the contact and the casing as per the German patent (application 0.3851 VIIIb/21c) through the use of a disk of preferably spiral-like slotted formation positioned parallel to the bimetal disk. In an arrangement like this the slotted conducting disk may be secured at its preferably unslotted center piece to the bimetal disk by means of the rivet contact, while at its likewise preferably unslotted rim-portion it is secured in clamped-in position between the bottom part and the and the cover part, or between one of the two parts and a rim-ring securing the two parts together. In this way there is obtained a good current and heat conduction and simultaneously a centering of the bimetal disk. In addition to this the conductor disk may preferably be so curved that it in contact position snugly rests against the bimetal disk, so that the latter, although relieved of the passage of the current, is heated up whenever a heating of the coils occurs through direct heat transmission from the conductors via the conductor disk.

If the cover part of the casing is just slightly curved, it may in addition to this, be provided in its center with a hollow cap of such curvature that the rivet-contact of the bimetal disk and conductor disk snugly fits into it when the bimetal disk is in snapped-out position. In this way there is obtained, on the one hand, the flattest possible casing shape for direct arrangement in coils, and, on the other hand, through direct contact of the bimetal disk and of the rivet contact with the cover part a quick heat transfer of the bimetal disk and consequently a speedy snapping back of the bimetal disk. The aforesaid flat curvature of the cover part is rendered possible particularly in combination with the bracing of the casing through profiling or through the use of an alloy adapted for re-tempering (copper-beryllium) as described in the German patent (application 0.6116 VIIIb/21c).

Finally, there may be arranged at the bottom part of the casing, that is to say, at the counter-contact, one or a plurality of insulating basins, whereby, on the one hand, sneak currents from the rivet-head are avoided, while, on the other hand, through variation of the insulating foils a variation of the contact pressure and consequently a switching adjustment is enabled as the switching temperature drops when the contact pressure rises.

Additional features and advantages of the invention will be understood from a consideration of the following detailed description taken in connection with the accompanying drawings forming a part of this specification and in which an embodiment of the invention has been shown by way of example. However, I wish to say that the invention is not confined to any strict conformity with the showing of the drawings but may be changed or modified, so long as such changes or modifications mark no material departure from the salient features of the invention as expressed in the appending claims.

Figure 2:
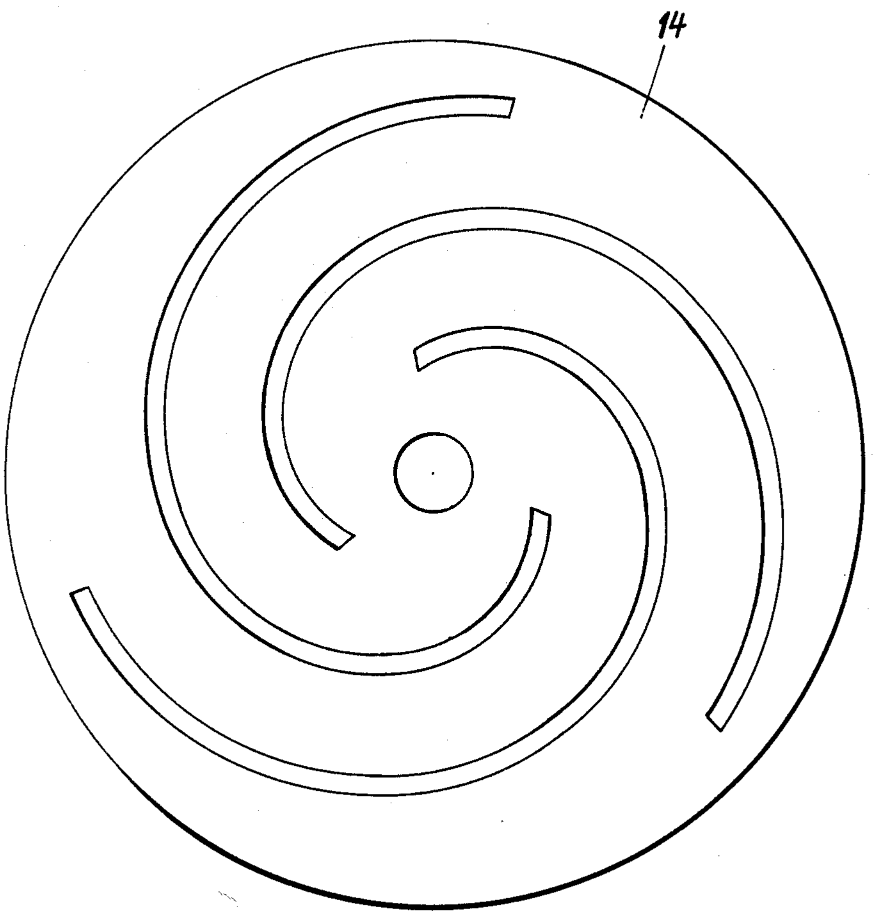

In the drawings, in which like parts are referred to by the same reference numerals, FIG. 1 is a central sectional view of the small-type thermostat of the invention;

FIG. 2 is a front view of the appertaining conductor disk.

As will be seen from the drawings, the lenticular casing consists of a cover part 1 and of a bottom part 2, which are secured to each other at the rim through flanging-over or, as illustrated, by means of a rim-ring 3. Arranged within the casing 1 and 2 is, in conformity with the main-patent, a bimetal disk 4 provided with a rivet-contact 5, which co-operates with a counter-rivet-contact 6 at the flattened portion 7 of the bottom part 2. Positioned within the flattened portion 7 of the bottom part 2 is an insulating member 8. Positioned upon the flattened portion 7 is the conductor ring 9, with an insulating member interposed between the conductor ring 9 and the counter-rivet-contact 6. Then follows the elastic insulating member 10; and then the conductor ring 11, which is in contact with the counter-rivet-contact 6. Two pressure plates 12 take care of a perfectly riveted coupling, holding together the two conductors and the insulating means.

According to the invention an increase of the switching effect at speedier heat supply is obtained by the feature that the bimetal disk 4 is polished and on all sides coated with a current well conducting metal layer, particularly with a galvanic silver coating 13. In addition to this it is possible to further increase and independently hereof the current and heat supply by the provision of a disk 14, preferably slotted in spiral-like fashion and arranged parallel to the bimetal disk.

As will be seen from FIG. 2 the slotted conductor disk 14 is at its unslotted central portion secured to the bimetal disk 4 by means of the rivet contact 5, while at its likewise unslotted rim-portion it is clampingly secured in position between the cover and bottom parts 1 and 2 and the rim-ring 3, whereby simultaneously a perfectly centralized position is guaranteed for the bimetal disk 4.

In addition to this the conductor disk 14 is so curved that, when in contact position (not shown here) it rests against the bimetal disk for the transmission of heat, whereby for the intensive transfer of heat a particularly quick time of reaction is obtained.

When in switch position the current passes now from the ring conductor 11 via the contact 6 of the casing to the switch contact 5, the conducting disk 14, located parallel to the bimetal disk 4, to the casing parts 1 and 2 and from the bottom part 2 off again via the ring conductor 9. Snapping in opposite direction of the bimetal disk 4 interrupts the current conduction or reverses it correspondingly, as will be seen from FIG. 1. The cover 1 of the casing is so slightly curved and provided with a curved cap 15 that in its switched-off position the bimetal disk 4 rests with its rivet-head 5 against the cover part and thus takes care of a speedy heat emission and quick return-switch. The slight curvature of the cover part 1 is enabled particularly through combination with a structure braced through profiling or consisting of an alloy adapted for re-tempering (copper beryllium) as disclosed by the supplementary patent (application 0.6116 VIIIb/21c).

Furthermore, it is possible to arrange at the counter contact 6 at the bottom part 2 one or a plurality of insulating basins 16, whereby on the one hand, sneak currents from the rivet-head 6 are avoided, while, on the other hand, through variation of the insulating foils 16 a variation of the contact pressure and consequently a switching adjustment is enabled as the switch temperature drops when the contact pressure rises.

What I claim as new and desire to secure by Letters Patent of the United States is:

1. A small type thermostat adapted to be inserted between windings of electrical machinery to prevent overheating of the same and comprising, in combination, a casing of lenticular shape formed by a pair of oppositely curved sheet metal members connected at annular rim portions thereof to each other; a flexible conductor disk made from current and heat well conductive material and formed with a spiral slot extending between an unslotted outer rim portion and a central portion of said conductor disk, said conductor disk being clamped at said outer unslotted rim portion thereof between said annular rim portions of said sheet metal members; a first contact fixed to a central portion of one of said sheet metal members insulated therefrom; a bimetal disk extending transversely through said casing and being located between said conductor disk and the other of said sheet metal members, said bimetal disk having an active position curved toward said first contact and being adapted to snap under the influence of heat to an inactive position curved away from said first contact; and a second contact fixed to said bimetal disk, extending through an opening in said central portion of said conductor disk and clamping said central portion of said conductor disk against said bimetal disk, said second contact engaging in said active position said first contact and said conductor disk being curved in such a manner as to be in contact substantially over the entire surface thereof with a corresponding face of said bimetal disk when the latter is in said active position so as to increase heat transfer from said casing through said conductor disk to said bimetal disk, whereby the time of response of said bimetal disk to heat imparted to the casing is greatly reduced.

2. An arrangement as defined in claim 1 in which the outer surface of said bimetal disk is coated with a silver layer.

References Cited in the file of this patent

UNITED STATES PATENTS

| | | |
|---|---|---|
| 1,767,709 | Smith | June 24, 1930 |
| 1,809,304 | Matthews | June 9, 1931 |
| 2,811,611 | Odenwald | Oct. 29, 1957 |
| 2,861,151 | Moore | Nov. 18, 1958 |

FOREIGN PATENTS

| | | |
|---|---|---|
| 799,002 | Great Britain | July 30, 1958 |
| 250,099 | Switzerland | Feb. 1, 1955 |
| 303,430 | Switzerland | May 18, 1948 |